July 8, 1941.  F. H. BOOR  2,248,158
CURVED TOOTH GEAR AND PINION WHEELS
Filed Dec. 20, 1939  2 Sheets-Sheet 1

INVENTOR.
FRANCIS H. BOOR
Hoodling and Kroot
ATTORNEY.

July 8, 1941.  F. H. BOOR  2,248,158
CURVED TOOTH GEAR AND PINION WHEELS
Filed Dec. 20, 1939   2 Sheets-Sheet 2

INVENTOR.
FRANCIS H. BOOR
BY
ATTORNEY.

Patented July 8, 1941

2,248,158

UNITED STATES PATENT OFFICE 2,248,158

CURVED TOOTH GEAR AND PINION WHEELS

Francis H. Boor, Lafayette, Ind., assignor to Fairfield Manufacturing Company

Application December 20, 1939, Serial No. 310,106

4 Claims. (Cl. 74—466)

My invention relates in general to gear wheel and pinion wheel constructions and more particularly to gear wheel and pinion wheel constructions having teeth curved across the face of the wheel, and includes both curved tooth spur gearing and curved tooth helical gearing.

In the past, gears have been provided with curved teeth, but the applicant's invention constitutes an improvement thereon. The present invention not only constitutes an improvement over curved tooth gearing but also gives important advantages over the straight tooth spur, the helical tooth spur, the continuous tooth herringbone and the interrupted tooth herringbone, avoiding at the same time a lot of the disadvantages.

An object of my invention is to provide a gear wheel and pinion wheel construction arranged such that the tooth contact or engagement can be located on any transverse section of the tooth face desired; that is to say, the tooth contact or engagement may be located near one end or near the median plane of the wheel depending upon the particular application.

Another object of my invention is to provide for controlling the length of the tooth contact or engagement by mis-matching the cutter radii.

Another object of my invention is to provide for generating the convex and the concave sides of a tooth space between adjacent teeth of the gearing about a common center, but with a different radii of curvatures.

Another object of my invention is to provide for generating the convex and the concave sides of a tooth space between adjacent teeth of the gearing about a common center lying within the plane of the gearing, but with a different radii of curvatures.

Another object of my invention is to provide for generating the convex and the concave sides of a tooth space between adjacent teeth of the gearing about a common center lying outside of the plane of the gearing, but having different radii of curvatures.

Another object of my invention is the provision of a gear wheel and pinion wheel construction arranged such that the convex side of the tooth space of one wheel and the concave side of the tooth space of the other wheel engage each other in the central transverse region of the wheel with the end of the teeth relieved to provide a rocking engagement to accommodate for limited axial mis-alignment of the wheels.

Another object of my invention is the provision of a gear wheel and pinion wheel construction arranged such that deflection under load of the supporting shafts, bearings and other component parts will not cause the tooth contact or engagement to become concentrated at one end of the teeth.

Another object of my invention is the provision of a gear wheel and pinion wheel construction arranged such that a limited axial mis-alignment of the wheels may be compensated for without damage to the teeth.

Other objects and a fuller understanding of my invention may be had by referring to the following description and claims, taken in conjunction with the accompanying drawings, in which:

Figures 8 to 12, inclusive, are a series of progressive diagrammatic plan views illustrating the relative positions of the wheel blank and the cutter in shaping a tooth space; and Figures 13 to 17, inclusive, are a series of progressive diagrammatic plan views showing the relative positions of a wheel blank and the cutter in finishing a side of a tooth space.

Figure 1:
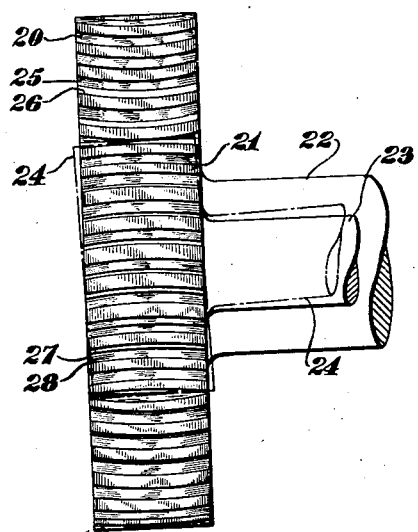
Figure 1 is a plan view embodying my gear wheel and pinion wheel construction, showing in addition by the dash-and-dot lines a limited axial mis-alignment of the wheels.

With reference to Figure 1 of the drawings, my gear wheel is indicated by the reference character 20 and my pinion wheel is indicated by the reference character 21, and each may be suitably secured to operating shafts 22 and 23, respectively. In Figure 1, the teeth are of the curved tooth spur type. The concave side and the convex side of a tooth space between adjacent teeth of the gear wheel 20 are indicated, respectively, by the reference characters 25 and 26, and the concave side and the convex side of a tooth space between adjacent teeth of the pinion wheel 21 are indicated, respectively, by the reference characters 27 and 28. The dash-and-dot line 24 in Figure 1, illustrates the manner that the gear wheel 20 and the pinion wheel 21 may become mis-aligned resulting, for example, from deflection under load of the supporting shafts, bearings or other component parts of the machinery. As the pinion wheel and the gear wheel move from a position of perfect alignment to a position of mis-alignment, as illustrated by the dash-and-dot line 24 in Figure 1, the curved teeth of the gear wheel 20 and the curved teeth of the pinion wheel 21 make rocking transverse engagement with respect to each other and prevent the tooth load from becoming concentrated in a small area at one end of the teeth. In actual practice, many gear failures are caused by the tooth load becoming concentrated on a small area at one end of the teeth due to deflections in the housing bearings and other parts of the machinery supporting the shaft and the gearing.

Figure 2:
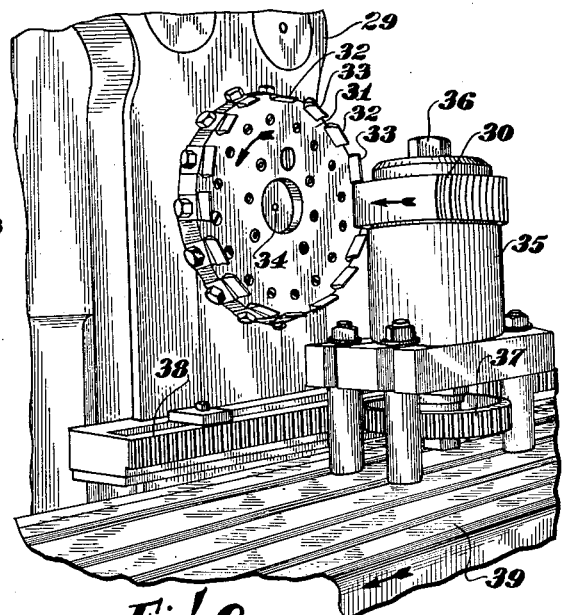
Figure 2 is a perspective and fragmentary view of a milling machine adapted to cut gear and pinion wheels in accordance with the features of my invention.
Figure 3:
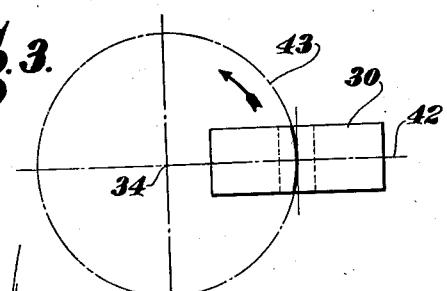
Figure 3 is a diagrammatic side view showing the relative position of a wheel blank and the path of the cutter for producing a curved tooth spur wheel in accordance with the provisions of my invention.

My gearing may be constructed by a milling machine 29, as illustrated in Figure 2, and it may comprise generally a cutting head 31 having a plurality of peripherially arranged, alternately staggered cutters 32 and 33 arranged to revolve about a common axial center 34. The wheel blank 30 which is to be processed may be carried by a fixture 35 suitably mounted upon a reciprocating table 39 which transversely moves the wheel blank 30 with reference to the revolving cutters 32 and 33. The wheel blank 30 is arranged to be non-rotatively secured to the upper end of a shaft which extends vertically through the fixture 35, such as for example by a nut 36. A gear wheel 37 is non-rotatively connected to the lower end of the vertical shaft and meshes with a longitudinal and transverse rack 38. As the reciprocating table 39 moves from right to left, indicated by the arrow line, the wheel blank 30 is caused to rotate in a clockwise direction as viewed from above. In cutting a curved tooth spur wheel, as shown in Figure 3 where the path of the cutters 32 and 33 is indicated by the dash-and-dot circle 43, the median plane 42 of the wheel blank passes through the axial center 34 of the cuting head 31. This means that the curved teeth of the spur type gear are symmetrical upon each side of the median plane of the wheel.

Figure 6:
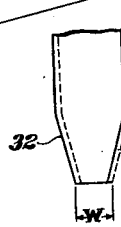
Figure 6 is an enlarged view showing the alternate staggered position of the cutters about the cutting head of the milling machine.

The alternate cutters 32 and 33 are slightly staggered such as shown in Figure 6, producing what is termed in the art as a spread-blade cutter. By this arrangement, the cutter blades 31 cut on the one side of a tooth space and then the cutter blades 32 cut on the opposite side of the tooth space. The effective width of the bottom of a tooth space is represented in Figure 6 by the distance W, called the point-width of the cutter. The individual cutter blades are narrower than the width W owing to the manner in which the blades are staggered in relation to each other. The gear 37 has the same size pitch circle as the pitch circle of the teeth being cut in the blank wheel 30 and as the cutter head 31 revolves, the reciprocating table 39 moves from right to left as indicated by the arrow in Figure 2. The meshing of the gear 37 with the rack 38 causes the wheel blank 30 to revolve in a clockwise direction, as viewed from above and indicated by the arrow, as the staggered blades 32 and 33 cut a tooth space in the blank 30. The teeth which are cut in this fashion are generated with involute profiles, as illustrated by the series of diagrammatic plan views in Figures 8 to 12, inclusive. The cutter that cuts on the inside in these series of views is represented by the reference character 33 and the cutter that cuts on the outside is represented by the reference character 32. After each tooth space is cut, the wheel blank 30 may be indexed by withdrawing the gear 37 from the rack 38 and rotating the teeth of the gear 37 with respect to the teeth of the rack 38 a distance equal to the pitch of the teeth being cut upon the blank 30. After the indexing is established, the wheel blank 30 is again brought into engagement with the cutters as explained above for cutting the next tooth space. This process is continued until all of the teeth of the gear blank 30 are cut.

Figure 7:
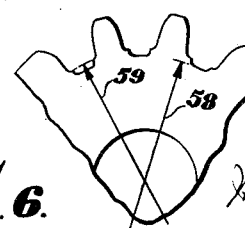
Figure 7 is a fragmentary view of a wheel showing the generated involute profile of the teeth.
Figure 8:
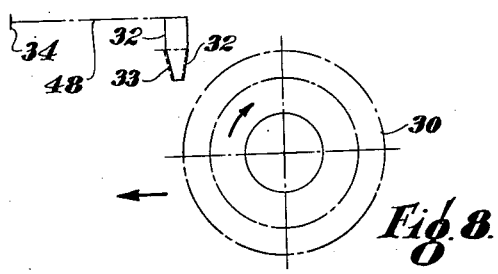
Figure 13:
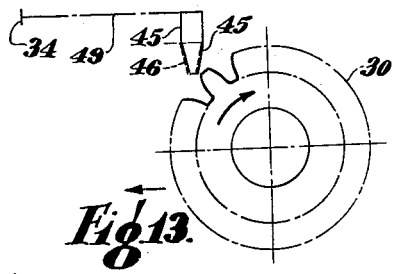
Figure 9:
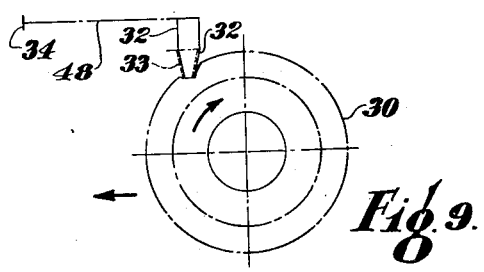
Figure 14:
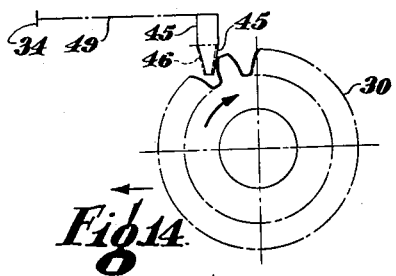
Figure 10:
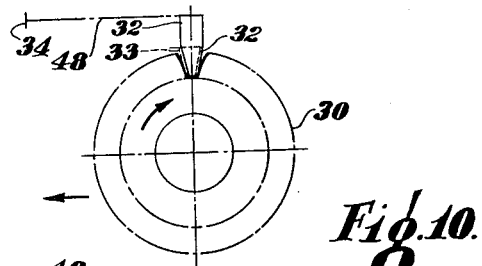
Figure 15:
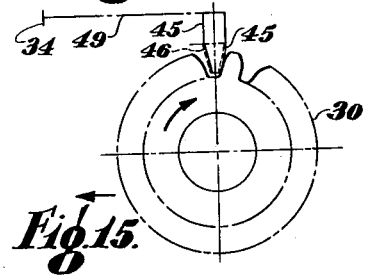
Figure 11:
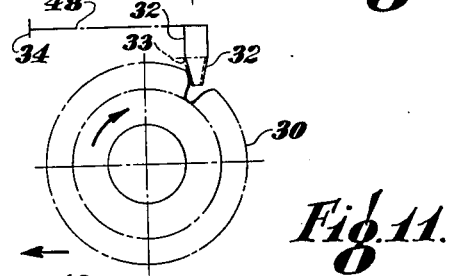
Figure 16:
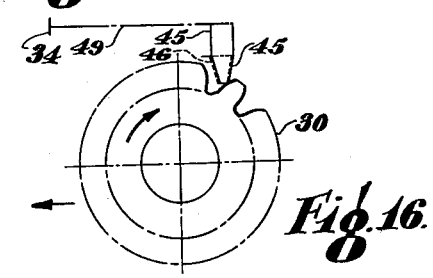
Figure 12:
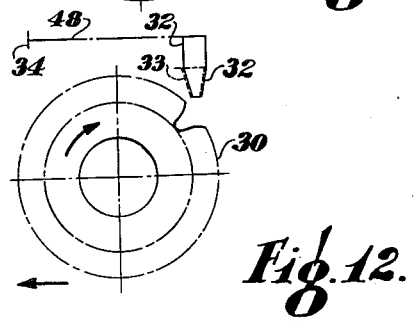
Figure 17:
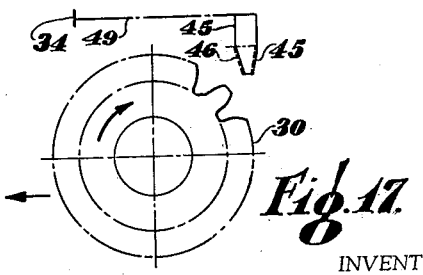

Depending upon the particular application and use of the gear wheel and pinion wheel construction, the curved teeth may be cut in one operation or they may be cut in two operations; a roughing operation and a finishing operation. In Figures 13 to 17, inclusive, I illustrate the action between the cutters and the wheel blank when finishing one side of a tooth space, after the teeth have been cut by the roughing operation as that illustrated in Figures 8 to 12, inclusive. The root diameter of the finished cut is slightly greater than the root diameter of the rough cut. Thus, for example, in Figure 7 the root diameter of the rough cut is indicated by the diameter 58 and the root diameter of the finished cut is illustrated by the diameter 59. In actual construction, the root diameter of the finished cut may be from .015 to .030 greater than the root diameter of the roughing cut. The view in Figure 7 is somewhat exaggerated. The same type of cutters are used for the finishing operation as for the roughing operation, although the finishing cutters are usually made more accurate. In Figures 13 to 17, inclusive, the reference characters 45 and 46 represent the outside and the inside finishing cutters, respectively, of the milling machine. In these series of figures, I show only one side of the tooth space being finished by the outside cutters 45, which are illustrated by the solid lines. This is generally referred to as the single-side method. The finishing cutters 45 are the only cutters performing a cutting operation during the cutting of the side of the tooth illustrated in these drawings. After all the teeth have been finished on one side, the work is indexed the proper amount so that the inside cutters 46, represented by the dotted line, finish the opposite side of each tooth space. The mean radius 48 for the cutters in the roughing operation, as shown in Figures 8 to 12, inclusive, and the mean radius 49 in the finishing operation, as shown in Figures 13 to 17 inclusive, are the same. Depending upon the design of the gear wheel and pinion wheel construction, the finishing of the teeth may also be done by the spread-blade method, that is both sides of each tooth space are finished in a single cutting cycle. In finishing the teeth by the single-side method, the point-width of the finishing cutter is less than the point-width of the roughing cutter. However, when the gearing is finished by the spread-blade method the point-width of the finishing cutters are wider than the point-width of the roughing cutters. It is a customary practice to remove about .020 stock from each side of the tooth during the finishing operation, depending upon the size of the teeth being generated.

In my gear wheel and pinion wheel construction, the convex side of the teeth of one wheel engage the concave side of the teeth of the mating wheel. The convex side of each tooth is generated by the inside cutting edges of the cutters and the concave side of each tooth is produced by the outside cutting edges of the cutters. If the mean radius of the cutters is designated as MR, then the radius travelled by the inside cutting edges is MR minus.

$$\frac{W}{2}$$

where W is the point-width of the cutters, and the radius travelled by the outside cutting edges is MR plus $$\frac{W}{2}$$

Figure 5:
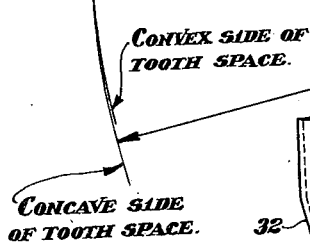
Figure 5 is a view illustrating the difference in in the curvature of the concave side and the convex side of a tooth space between adjacent teeth of my gearing.

These different radii are shown in Figure 5. This shows how it is possible to make two mating gears with the same cutter and generate the convex side and the concave side of a tooth space with different radii of curvatures so that a rocking engagement is produced to accommodate limited misalignment of the mating wheels resulting from deflections under load of the supporting shafts, bearings, or other component parts of the machinery supporting the gearing construction. The mis-matching of the teeth governs the length of the tooth contact of the rocking engagement. The reason that this rocking engagement is so desirable is that it helps to compensate for deflections that are always present in bearings, shafts, and housings when under load. The amount of the deflections determines how much mis-matching of the teeth is desirable. At all times the tooth load should not be allowed to become concentrated at a local area in one end of the teeth as this causes chipping of the corners and rapid failures.

Figure 4:
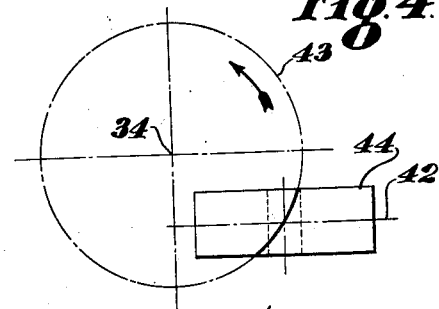
Figure 4 is a diagrammatic side view illustrating the relative position of a wheel blank and the path taken by the cutter in producing a curved tooth helical wheel in accordance with the features of my invention.

In Figure 4, I illustrate the manner of producing curved helical gears and this is accomplished by lowering the plane of the blank 44 below the axial center 34 of the cutting head, so that the revolving path of the cutters, as illustrated by the dash-and-dot circle 43 passes through the blank 44 at an angle to the face of the blank. On a curved tooth helical, a line tangent to the tooth in the center of its face makes an angle with the axial center of the wheel, whereas in Figure 3 on a curved tooth spur a line tangent to the curved tooth at the center of its face is parallel to the axial center of the wheel. The helical angle can be varied by changing the distance between the median plane 42 of the blank and the axial center 34. In both the curved spur gear and the curved helical gear, the convex side of the tooth space of one wheel and the concave side of the tooth space of the other wheel engage each other for a transverse distance less than the width of either the gear wheel or the pinion wheel, with the ends of the teeth relieved to provide for the rocking engagement. In both the spur and the helical type of curved gear, the convex and the concave side of the tooth spaces are generated about the same generating center 34 with different radii of curvatures. In the case of the curved spur gear, the generating center 34 lies within the median plane of the wheel blank, whereas in the case of the curved helical gear the generating center 34 lies outside of the median plane of the gear blank.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A gear wheel and a pinion wheel construction comprising, a gear wheel having an axis and having a plurality of curved teeth each having a generated involute profile, the spaces between the teeth being the same from one side of the wheel to the other and the sides of the spaces being arcs of circles having a common center, a pinion wheel having an axis substantially parallel to the axis of the gear wheel and having a plurality of similar curved teeth each having a generated involute profile adapted to mesh with the curved teeth of the gear wheel, the spaces between the teeth of the pinion wheel being the same from one side of the wheel to the other and the sides of the spaces being arcs of circles having a common center, the tooth space between adjacent teeth of the gear wheel and of the pinion wheel defined by a convex and a concave side, each said side being curved about the same generating center with different radii of curvature, the radius of curvature of the convex side of the tooth space being smaller than the radius of curvature of the concave side by an amount substantially equal to the tooth space between adjacent teeth, and the convex side of the tooth space of one wheel and the concave side of the tooth space of the other wheel engaging each other in the central transverse region of the said wheels, the ends of the engaging sides of the teeth deviating from each other by an amount resulting from the difference in the radius of curvature to provide for a rocking engagement to accommodate limited relative movements of the axes of the gear and pinion wheels.

2. A gear wheel and a pinion wheel construction comprising, a gear wheel having an axis and having a plurality of curved teeth each having a generated involute profile, the spaces between the teeth being the same from one side of the wheel to the other and the sides of the spaces being arcs of circles having a common center, a pinion wheel having an axis substantially parallel to the axis of the gear wheel and having a plurality of similar curved teeth each having a generated involute profile adapted to mesh with the curved teeth of the gear wheel, the spaces between the teeth of the pinion wheel being the same from one side of the wheel to the other and the sides of the spaces being arcs of circles having a common center, the tooth space between adjacent teeth of the gear wheel and of the pinion wheel defined by a convex and a concave side, each said side being curved about the same generating center lying substantially in the center plane of the wheels and being generated with different radii of curvature, the radius of curvature of the convex side of the tooth space being smaller than the radius of curvature of the concave side by an amount substantially equal to the tooth space between adjacent teeth, and the convex side of the tooth space of one wheel and the concave side of the tooth space of the other wheel engaging each other in the central transverse region of the said wheels, the ends of the engaging sides of the teeth deviating from each other by an amount resulting from the difference in the radius of curvature to provide for a rocking engagement to accommodate limited relative movements of the axes of the gear and pinion wheels.

3. A gear wheel and a pinion wheel construction comprising, a gear wheel having an axis and having a plurality of curved teeth each having a generated involute profile, the spaces between the teeth being the same from one side of the wheel to the other and the sides of the spaces being arcs of circles having a common center, a pinion wheel having an axis substantially parallel to the axis of the gear wheel and having a plurality of similar curved teeth each having a generated involute profile adapted to mesh with the curved teeth of the gear wheel, the spaces between the teeth of the pinion wheel being the same from one side of the wheel to the other and the sides of the spaces being arcs of circles having a common center, the tooth space between adjacent teeth of the gear wheel and of the pinion wheel defined by a convex and a concave side, each said side being curved about the same generating center lying outside the center plane of the wheels and being generated with different radii of curvature, the radius of curvature of the convex side of the tooth space being smaller than the radius of curvature of the concave side by an amount substantially equal to the tooth space between adjacent teeth, and the convex side of the tooth space of one wheel and the concave side of the tooth space of the other wheel engaging each other in the central transverse region of the said wheels, the ends of the engaging sides of the teeth deviating from each other by an amount resulting from the difference in the radius of curvature to provide for a rocking engagement to accommodate limited relative movements of the axes of the gear and pinion wheels.

4. A gear wheel and a pinion wheel construction comprising, a gear wheel having a plurality of curved teeth each having a generated involute profile, the spaces between the teeth being the same from one side of the wheel to the other and the sides of the spaces being arcs of circles having a common center, a pinion wheel having a plurality of similar curved teeth each having a generated involute profile adapted to mesh with the curved teeth of the gear wheel, the spaces between the teeth of the pinion wheel being the same from one side of the wheel to the other and the sides of the spaces being arcs of circles having a common center, the tooth space between adjacent teeth of the gear wheel and of the pinion wheel defined by a convex and a concave side, each said side being curved about the same generating center with different radii of curvature, the radius of curvature of the convex side of the tooth space being smaller than the radius of curvature of the concave side by an amount substantially equal to the tooth space between adjacent teeth, and the convex side of the tooth space of one wheel and the concave side of the tooth space of the other wheel engaging each other in the central transverse region of the said wheels, the ends of the engaging sides of the teeth deviating from each other by an amount resulting from the difference in the radius of curvature to provide for a rocking engagement to accommodate limited relative movements of the gear and pinion wheels.

FRANCIS H. BOOR.